March 12, 1929.     E. W. DAVIS     1,705,283
LUBRICATING SYSTEM
Filed Feb. 21, 1924
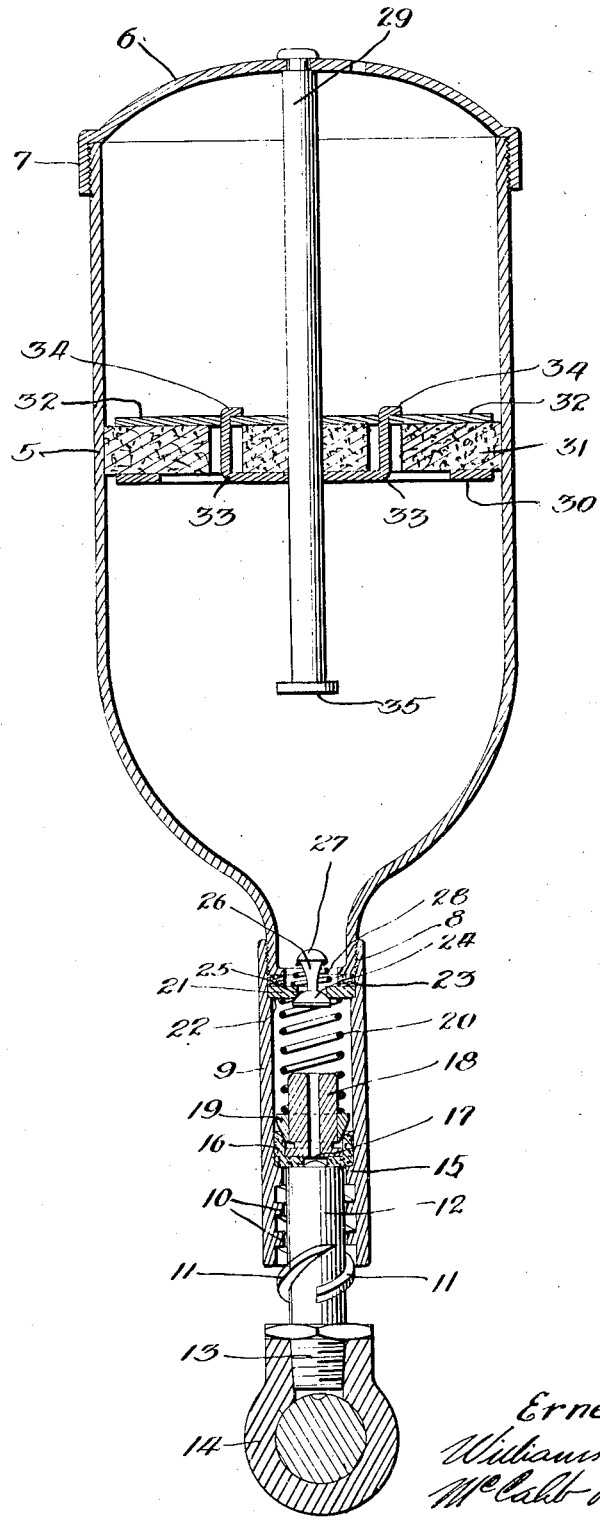
Inventor
Ernest W. Davis.

Patented Mar. 12, 1929.

1,705,283

UNITED STATES PATENT OFFICE.

ERNEST W. DAVIS, OF OAK PARK, ILLINOIS, ASSIGNOR TO ALEMITE MANUFACTURING CORPORATION, OF CHICAGO, ILLINOIS, A CORPORATION OF DELAWARE.

LUBRICATING SYSTEM.

Application filed February 21, 1924. Serial No. 694,378.

My invention relates to improvements in lubricating systems, and is particularly concerned with the provision of a novel lubricating system comprising a plurality of fittings to be secured to the bearings to be lubricated, and a compressor for successively supplying lubricant under pressure to these fittings.

The objects of my present invention are,

First, to provide a lubricating system such as described, in which the fittings are provided with cam surfaces adapted to co-operate with elements of the compressor to place lubricant in the compressor under pressure when the compressor or portion thereof is moved relatively to the fittings;

Second, to provide a construction such as described, in which the elements of the compressor and fitting are so arranged that when the compressor is rotated relatively to the fittings, a charge of lubricant under pressure will be forced into the fittings;

Third, to provide a construction such as described, in which the fitting is provided with one or more spiral cams, and the compressor is provided with a coupling member having surfaces for co-acting with the thread or threads on the fitting, so that as the compressor is rotated relatively to the fitting a plunger forming a part of the compressor will be actuated to place the lubricant adjacent the plunger under pressure;

Fourth, to provide a construction such as described, in which the plunger effects a seal between the compressor and the fitting;

Fifth, to provide novel means for insuring a tight joint between the plunger and the sleeve or cylinder in which it operates; and Sixth, to provide a lubricating system of the character described, which is simple in construction, economical to manufacture, and easy to operate.

Other objects of my invention will appear as this description progresses, reference being had to the drawing which discloses a central longitudinal section of my improved compressor in position to co-act with the fitting which forms a part of my invention and which is here shown in side elevation.

Referring to the drawing, my improved compressor comprises a barrel 5 having a cap 6 detachably secured to one end thereof by means of a suitable screw thread connection 7. The other end of the barrel terminates in an externally threaded nipple 8 to which is secured one end of the coupling sleeve or cylinder 9. The outer end of the coupling sleeve 9 is provided with internal threads 10 of comparatively steep pitch. In the form illustrated herein, two threads 10 are provided for co-acting with the double thread or cam surface 11 with which the fitting 12 is provided. This fitting is provided with the usual pipe thread 13 to secure it to the bearing 14 which is to be lubricated, and its inner end is cylindrical in form and of such diameter that it can readily pass through the threaded end of the sleeve 9.

A shoulder 15 is formed within the sleeve 9 to act as a stop for the cup leather 16 which is provided with the central aperture 17. A displacing element 18 has one end secured in the cup leather 16, and the other end acts as a centering device for the beveled spreader ring 19 and also for the outer end of the compression spring 20, the outer end of which abuts against the inner face of the spreader ring 19, and the inner end of which abuts against the disc 21 which is clamped between a shoulder 22 on the sleeve 9 and the gasket 23, this gasket being clamped against the disc 21 by the end of the nipple 8.

I provide a valve 24 for co-acting with the valve disc 21 to prevent return flow of lubricant to the barrel 5 after it has once passed through the port 25 into the cylinder. The valve 24 has a valve stem 26 which terminates in a head 27 that acts as an abutment for one end of the spiral spring 28. The other end of this spring rests against or upon the disc 21. The head 27 is just small enough to pass through the port 25.

A rod 29 is secured to the cap 6 and projects inwardly into the barrel 5. A piston comprising the face plate 30, the felt disc 31, and the follower plate 32, is slidably mounted in the barrel 5. The face plate 30 has tongues 33 struck therefrom which extend through the felt disc 31 and the follower plate 32, and are riveted over at their outer ends as shown at 34 to hold the piston in assembled relation. The three elements forming the piston are provided with aligned openings for receiving the rod 29 so that the piston is free to float in the cylinder 5. Preferably, the inner end of the rod 29 is provided with an enlargement 35 which engages the piston when the cap is unscrewed and the rod 29 is pulled out of the barrel 6. In this manner the piston is carried along with the cap 6 and rod 29 so that the barrel can be filled with lubricant.

When the barrel has been filled with lubricant and the cap 6 replaced, the operator positions the open end of the coupling sleeve 9 upon the end of the fitting 12 in the manner indicated in the drawing and then rotates the barrel 5 in the proper direction to cause the threads 10 to engage the threads 11 and move the coupling sleeve or cylinder 9 downwardly over the fitting. The end of the fitting engages with the cup leather 16, and as the sleeve 9 moves over the fitting the cup leather is pushed inwardly into the sleeve and displaces the contents of the sleeve 9 which are held between the cup leather and the valve 24. When the inward movement of the fitting 12 relatively to the sleeve 9 is completed, the operator turns the barrel 5 in the opposite direction and the spring 20 forces the cup leather to its outermost position. In doing this a vacuum is created in the cylinder which opens the valve 24 and sucks the lubricant from the barrel 5 into the cylinder. The operator thereupon turns the barrel 5 in the opposite direction and again displaces the contents of the cylinder 9. By repeating this operation, the operator can force into the fitting 12 as much lubricant as may be desired. It will, of course, be understood that the valve of the fitting 12 assists in developing the vacuum in the cylinder 9, but ordinarily this valve can be dispensed with because the resistance to the movement of lubricant in the bearing itself will be sufficient to prevent the return flow of lubricant to the cylinder 9 from the fitting 12 when the cup leather 16 and displacer 18 move outwardly.

It will be noticed that the spring 20 pushes against the inner face of the spreader ring 19 and is so positioned that it tends to force the edge of the flange of the cup leather 16 outwardly against the walls of the cylinder 9 and thus prevents the access of air to the cylinder 9, resulting from leakage between the cup leather and the cylinder.

With the compressor described above, lubricants of either the liquid or plastic variety can be readily forced into a bearing even when the barrel of the piston is below the level of the bearing.

While I have described the details of construction of the preferred embodiment of my invention, it is to be clearly understood that my invention is not limited to these details of construction, but is capable of other adaptation and modifications within the scope of the appended claims.

Having thus described my invention, what I claim is:—

1. The combination with a fitting having external spiral cam surfaces, of a compressor comprising a barrel, a cylinder secured to said barrel and comunicating therewith, the outer end of said cylinder being provided with internal inclined cam surfaces for co-acting with the cam surfaces on said fitting, a cup leather slidable in said cylinder, a displacer having one end extending into said cup leather, a beveled spreader ring surrounding said displacer and bearing against said cup leather, a spring having one end bearing against said spreader ring, and an outwardly opening valve between said barrel and said cylinder.

2. A lubricant compressor comprising a cylinder, a shoulder therein, an apertured cup leather slidable in said cylinder, means for maintaining the bottom of said cup leather in a substantially flat position against said shoulder, and further means co-operative with said first mentioned means to expand the upturned flange of the cup leather against the wall of the cylinder.

3. A lubricant compressor comprising a cylinder, a shoulder therein, a cup leather slidable in said cylinder, a central aperture therein, a cylindrical die member formed into a flat disc at one end to retain the position and form of said aperture, a spreader ring sliding upon the cylindrical die member and beveled to expand the upturned flange of the cup leather, and a spring for holding said spreader ring in contact with said cup leather.

4. A lubricant compressor comprising a cylinder, a shoulder in one end thereof, a cup leather adapted to reciprocate in the cylinder and seat on said shoulder, a complementary fitting part adapted to enter the cylinder thereby to unseat the cup leather, and spring actuated means to move said cup leather toward the shoulder and to expand the cup leather outwardly against the walls of the cylinder.

In witness whereof, I hereunto subscribe my name this 28th day of February, 1924.

ERNEST W. DAVIS.